Patented Mar. 14, 1933

1,900,944

UNITED STATES PATENT OFFICE

JOHN KEARSLEY MITCHELL, OF PHILADELPHIA, PENNSYLVANIA, ASSIGNOR TO DISPERSIONS PROCESS, INC., OF DOVER, DELAWARE, A CORPORATION OF DELAWARE

RECOVERY OF FIBROUS MATERIAL AND RUBBER FROM WASTE RUBBER STOCK

No Drawing. Application filed August 1, 1928. Serial No. 296,870.

In the rubber industry, most of the waste rubber stocks are associated with fibrous material. Heretofore it has generally been the custom to recover only the rubber from such stock, the fibrous material being destroyed by chemical action, since for the recovery of both the fibrous material and the rubber, for instance by the use of organic rubber solvents, is generally uneconomical and impracticable.

It is the object of the present invention to provide an economical method of recovering the fibrous material, as well as the rubber, from waste rubber stock in a condition suitable for use in the manufacture of good grade papers or other fibrous products. In accordance with the present invention, a hydrophilic colloid or other suitable dispersing agent, is incorporated into the stock with the rubber, either while it is in plastic condition, or else during the process of plasticizing the stock, in which case it may also serve as a plasticizing agent, and water is gradually manipulated thereinto until a change of phase takes place and the rubber disperses in the form of minute globules or particles in the aqueous medium. This frees the fibrous material from the rubber so that the resulting aqueous rubber dispersion contains the fibrous material in suspension therein. The fibrous material may be separated out in any suitable manner, as by diluting the dispersion with water to the desired consistency and then passing it over a screen of a mesh designed to permit the aqueous rubber dispersion to pass through while the fibers are deposited or caught on the screen.

The rubber may be recovered from the aqueous rubber dispersion in any suitable way, such as by coagulation with any suitable coagulating agent or by evaporating its aqueous content, or the rubber dispersion may be kept as such or concentrated and employed in the treatment of fabrics in the manufacture of waterproof papers, or for any other desired purpose. Or, if desired, the fibers may be kept suspended in the rubber dispersion, and the mixture charged into a beater engine, together with additional fiber, if desired, then beaten to the desired extent for paper manufacture, and the dispersed rubber coagulated on the fiber with a suitable coagulant such as alum, before the charge is run off on the paper machine to produce a waterproof paper the fibers of which are bonded together and encased in rubber.

If the fiber is separated from the rubber, it may be washed and cleansed in an alkali or soap solution, bleached, and finally dewatered or dried, in which condition it is similar to the fiber recovered from non-rubberized waste fibrous materials and constitutes an excellent raw material for the manufacture of papers or felts, particularly when recovered from waste rubber stock the fibrous material of which comprises cotton fibers of long staple.

One of the major advantages residing in the process of the present invention is that the recovered fibrous material is substantially completely freed from rubber and after suitable conditioning treatment may be employed in the manufacture of good grade papers. This advantage is of especial significance, as it has heretofore been difficult to remove the last traces of rubber from the fibrous material, as a result of which the fibrous material was suited for the manufacture of only such products as roofing felts, coarse papers, paperboard, or the like, where discolorations due to the presence of residual rubber was of no consequence.

When the hydrophilic colloid used in effecting the dispersion of the rubber is incorporated into the stock, it is necessary that the rubber be in plastic condition, so as to permit a uniform distribution of the colloid throughout the mass, so that when water is gradually manipulated thereinto, a uniform and complete dispersion of the rubber will take place. While the hydrophilic colloid and the water are being distributed through the plastic mass of rubber, the fibrous material is progressively disintegrated into small pieces or fibers, which also become uniformly distributed through the mass. The pieces or fibers appear to become clean as manipulation progresses, the coherent rubber mass evidently tending to pick up the rubber on the surface of the fibrous material and form one continuous mass. It is probably for this reason that a dispersion of substantially all the rubber takes place so as to permit the substantially complete freeing of the fibrous material from all the rubber with which it was associated.

The present invention may best be understood by citing specific examples of procedure such as the following. The process may be carried out using uncured tire cord clippings (so-called uncured friction) as the raw stock, but it is, of course, evident that other types of waste rubber stock and comprising other fibrous material such as wool, jute, linen, or the like, might be employed. The clippings are preferably first conditioned for recovery processing by passing them through a roll mill a sufficient number of times to disintegrate the fabric and further to plasticize the plastic or uncured rubber. The milling is preferably performed with the rolls fairly well separated, say about one-half inch, so as to minimize cutting or tearing of the fibers, and is continued no longer than is necessary, three times through the mill usually proving sufficient. The milling does not materially shorten the fibers of the fabric, the fabric merely being disintegrated and distributed throughout the rubber mass essentially in the form of fabric fragments or fibers of original length. About one hundred parts of waste stock thus conditioned is added to a jacketed mixer of any suitable type, for instance a mixer of the Ross, Werner & Phleiderer, Day, or Banbury type, which is designed to effect a kneading, stretching, and pulling action on the mass, and the mixer set in operation. Twenty parts of water may then be added, and the mass is then preferably heated, e. g., to a temperature of about 65° C., by introducing steam at about 20 pounds pressure into the jacket, while the mixing is continued until the water has been uniformly distributed throughout the mass. Ten parts of casein, which has preferably been swollen in twenty parts of water, is then added and uniformly disseminated throughout the mass, whereupon three-fourths part of caustic soda is added to render the casein water-soluble. The casein may be added in water-soluble condition as sodium caseinate rather than being formed in situ in the mixer. As the mass is kneaded, pulled, and stretched by the operation of the mixer, water is gradually added and as the operation continues the rubber gradually softens and at the end of about one-half hour a smooth, homogeneous, paste-like mass is produced, consisting of an aqueous rubber dispersion in which the freed fibers are suspended. This mass may be employed as such in the manufacture of waterproof paper, as previously described, or the feed fibers may be separated therefrom by diluting it with water and then screening or filtering out the fibers from the diluted aqueous rubber dispersion.

The fiber thus recovered may be washed and, if desired, treated with suitable reagents, and finally dried, while the rubber may be recovered from the aqueous rubber dispersion by the use of suitable coagulating agents or by evaporating the aqueous content of the dispersion. The rubber so recovered is of good physical characteristics, being characterized by its freedom from grit and coarse particles, as well as its uniformity of texture.

While the example hereinbefore given recites certain definite proportions of the various materials employed which have been found to give good results with one type of waste rubber stock, it is manifest that these proportions will vary with the stock being processed, as the stock may vary widely in its rubber content. The hydrophilic colloid employed in producing the dispersion may be milled into the stock rather than being introduced while the stock is subsequently being subjected to a kneading, stretching, and pulling action such as described. If desired, the composition of the rubber recovered may be modified from that of the original waste stock, by incorporating oils, gums, fillers, pigments, sulphur, accelerators of vulcanization, or other suitable agents thereinto while it is being milled or while it is being kneaded, stretched and pulled. Where hydrophilic colloids, such as soaps, are employed in effecting the dispersion of the rubber, these may be added in prepared condition or may be formed in situ in a mixer. Other suitable hydrophilic colloids, such as a glue, saponin, sea moss jelly, colloidal clay, albumin, or the like, may also be employed.

In lieu of effecting a complete separation of fiber from rubber by dispersing the rubber in an aqueous medium so that the fiber becomes suspended in a resulting dispersion, a partial separation of fibrous material from rubber may be effected. I have found that such partial separation may be accomplished if the plastic rubber stock is manipulated in the presence of certain agents which render the fibrous material non-adherent to the rubber mass and which I term "stripping agents," so that as manipulation of the mass proceeds the fibrous material tends to work out of the rubber mass. In order to avoid impairing the value of the fibrous material, it is preferable that the agent employed be water-soluble, so that after most of the fibrous material has been worked out of and separated from the rubber, the agent employed may be washed from the fibrous material and the rubber. I have found that there are various water-soluble agents such as glycerine or sulphonated oil, which are suitable for this purpose. When these agents are manipulated into the stock, they tend to soften the rubber and the fibers separate out gradually on the surface of the rubber mass in a relatively loose condition, as manipulation progresses. This separation, however, is incomplete, as a considerable proportion of the fibrous material is worked back into the rubber mass. After removal of the fibrous material separated out, the rubber mass may then be dispersed by the addition of a hydrophilic colloid and the gradual manipulation of water thereinto, as hereinbefore described, whereupon the residual fibrous material may be separated out of the resulting dispersion. A procedure of this kind may be practised substantially as follows. One hundred parts, by weight, of conditioned or plasticized stock is charged into a mixer of the type previously mentioned and the mixer then set in operation, whereupon sulphonated oil is gradually added to the mass during the mixing operation, in amount equal by weight to that of the stock. The mass gradually warms during the mixing operation, the oil gradually being absorbed by the mass, softening the rubber and freeing the fibrous material, while at the same time the freed fibers gradually work to the surface of the mass, so that at the end of about one-half hour most of the fiber appears in a relatively loose condition on the surface of the mass and may be readily removed from the mass. The fiber thus freed exists essentially in the form of fabric fragments and fibers which are substantially of original length, and when the fabric is composed of high grade fiber, such as Egyptian or sea island cotton, a good deal of the fiber appears in the form of the long staple originally employed in the weaving of the fabric. The fiber remaining in the rubber mass may be recovered therefrom by following the procedure of dispersion hereinbefore given. The fiber recovered may be readily washed free from sulphonated oil and then, if desired, subjected to suitable conditioning treatment, and finally dried. In the example given, glycerine may be employed in place of the sulphonated oil and in the same proportion, or together with the oil, apparently functioning better than the oil alone in freeing the fibers and causing them to work loose from the rubber. Together with the sulphonated oil or glycerine, a certain amount of water may be used and heat applied to the mass, but too much water should not be added, as the effectiveness of the stripping agents is thereby reduced. While the example given cites the use of a definite proportion of oil and/or glycerine, a greater or less proportion might be used, depending upon the amount of fibrous material which it is desired to separate initially.

While the specific examples hereinbefore given relate to the processing of one type of waste rubber stock, namely, uncured friction so called, available as waste material in the manufacture of certain rubber goods such as cord tires, boots and shoes, raincoats, etc., other types of waste stocks associated with fibrous material may be employed, for example, stocks such as are obtained by plasticizing waste vulvanized rubber associated with fibrous material (e. g., tire carcass), but without the destruction of the fibrous material. For instance, waste vulcanized stock may be put through a machine which effects an approximate separation of the vulcanized rubber from the fibrous material, a so-called Bauer machine being available for this purpose. The rubber thus separated from the fibrous material may contain about 5% fibrous material, while the separated fibrous material may contain 20% rubber. The separated rubber may be plasticized by suitable treatment, for example, by digesting in a comparatively dilute solution or caustic soda, and/or by manipulation or milling on a roll mill in the presence of softeners until a mass of the desired plasticity and coherence has been produced. Of course, the vulcanized stock as a whole may first be plasticized and then subjected to recovery processing as hereinbefore described.

In some cases a dispersion of the stock may be effected by a process in which a percentage of rosin is employed both as a plasticizing and dispersing agent, during the manipulation of the stock in a so-called Banbury mixer, followed by the gradual incorporation of water into the rubber mass until the change of phase occurs, and the rubber becomes the disperse phase in a continuous aqueous phase.

It will be evident to those skilled in the art that various changes and modifications might be made in the examples hereinbefore given without departing from the spirit or scope of invention as defined in the appended claims.

What I claim is:

1. A process of recovering fibrous material and rubber from waste rubber stock associated with fibrous material, which comprises manipulating the stock with the rubber as a plastic, coherent mass in the presence of sulphonated oil to strip the rubber from the fibrous material so that the latter works its way to the surface of the mass, and removing the fibrous material from the rubber mass.

2. A process of recovering fibrous material and rubber from waste rubber stock associated with fibrous material, which comprises manipulating the stock with the rubber as a plastic, coherent mass in the presence of sulphonated oil and glycerine to strip the rubber from the fibrous material so that the latter works its way to the surface of the mass, and removing the fibrous material from the rubber mass.

3. A process which comprises subjecting a waste rubber-fibrous stock containing long-fibered material, as a plastic, coherent and integral mass to manipulation without impairing the fibrous material for papermaking, in the presence of water and a hydrophilic colloid capable of freeing the fibrous material from the rubber to produce an aqueous dispersion of rubber containing freed fibrous material in suspension therein, beating the mixture and coagulating the rubber on the fibrous material, and running the beaten mass off on a paper machine.

4. A process of recovering fibrous material and rubber from waste rubber stock associated with fibrous material, which comprises manipulating the stock with the rubber as a plastic, coherent and integral mass in the presence of little, if any, water, but in the presence of water-soluble, liquid agents which serve to soften the rubber and to render the rubber non-adherent to the fibrous material so that the latter works its way to the surface of the mass, and removing the fibrous material from the rubber mass.

5. A process of recovering fibrous material and rubber from waste rubber stock associated with fibrous material, which comprises manipulating the stock as a plastic, coherent and integral mass in the presence of little, if any, water, but in the presence of water-soluble, liquid agents which serve to soften the rubber and to render the rubber non-adherent to the fibrous material so that the latter works its way to the surface of the mass, removing the fibrous material from the rubber mass, and washing the removed fibrous material with water to remove such agents.

In witness whereof I have affixed my signature.

JOHN KEARSLEY MITCHELL.